United States Patent
Gupta et al.

(10) Patent No.: US 10,409,859 B2
(45) Date of Patent: Sep. 10, 2019

(54) VIDEO HEAT MAPS PERSONALIZED FOR ONLINE SYSTEM USERS

(71) Applicant: Facebook, Inc., Menlo Park, CA (US)

(72) Inventors: Saurabh Gupta, Sunnyvale, CA (US); Aditya Palnitkar, Mountain View, CA (US); Yash Gupta, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 332 days.

(21) Appl. No.: 15/595,745

(22) Filed: May 15, 2017

(65) Prior Publication Data
US 2018/0329928 A1 Nov. 15, 2018

(51) Int. Cl.
| | | |
|---|---|---|
| G06F 16/58 | (2019.01) | |
| G06F 16/70 | (2019.01) | |
| G06K 9/00 | (2006.01) | |
| G06F 16/435 | (2019.01) | |
| G06F 16/907 | (2019.01) | |
| G06F 16/9535 | (2019.01) | |
| G06F 16/9537 | (2019.01) | |
| G06Q 50/00 | (2012.01) | |
| G06Q 30/02 | (2012.01) | |

(52) U.S. Cl.
CPC ........ *G06F 16/5866* (2019.01); *G06F 16/437* (2019.01); *G06F 16/70* (2019.01); *G06F 16/907* (2019.01); *G06F 16/9535* (2019.01); *G06F 16/9537* (2019.01); *G06K 9/00711* (2013.01); *G06Q 30/02* (2013.01); *G06Q 50/01* (2013.01)

(58) Field of Classification Search
CPC .......................... G06F 16/70; G06K 9/00711
See application file for complete search history.

(56) References Cited

U.S. PATENT DOCUMENTS

| | | | |
|---|---|---|---|
| 8,175,413 B1 * | 5/2012 | Ioffe | G06K 9/20 382/100 |
| 9,138,652 B1 * | 9/2015 | Thompson | H04N 21/2358 |
| 2012/0185889 A1 * | 7/2012 | Folgner | H04H 60/33 725/13 |
| 2013/0091432 A1 * | 4/2013 | Shet | G08B 13/19645 715/719 |
| 2015/0363635 A1 * | 12/2015 | Suri | G06K 9/00268 386/241 |
| 2016/0034786 A1 * | 2/2016 | Suri | G06K 9/6256 382/159 |

(Continued)

*Primary Examiner* — Charles E Lu
(74) *Attorney, Agent, or Firm* — Fenwick & West LLP

(57) ABSTRACT

An online system generates personalized video heat map for a target user, which visually indicates segments of a video likely to be of interest to the target user. The online system divides the video into the segments and identifies actions performed by users other than the target user on each of the segments. The online system determines embedding vectors describing each segment as represented by the identified actions performed on the segment and also determines an embedding vector describing the target user. Based on those embedding vectors, a personalized score for the segment is determined using a trained model. The online system uses the personalized score for each segment of the video to generate the personalized heat map. The personalized heat map can be provided to the target user along with the video.

20 Claims, 4 Drawing Sheets

(56) References Cited

U.S. PATENT DOCUMENTS

| | | | |
|---|---|---|---|
| 2016/0070962 A1* | 3/2016 | Shetty | G06F 16/7834 |
| | | | 382/225 |
| 2016/0253801 A1* | 9/2016 | Linard | G06T 7/0016 |
| | | | 382/128 |
| 2016/0261894 A1* | 9/2016 | Li | H04N 21/23418 |
| 2016/0328627 A1* | 11/2016 | Fujii | G06F 21/6254 |
| 2017/0124400 A1* | 5/2017 | Yehezkel Rohekar | |
| | | | G06K 9/00335 |
| 2018/0267996 A1* | 9/2018 | Lin | G06K 9/00684 |
| 2018/0332317 A1* | 11/2018 | Song | H04N 21/21805 |

* cited by examiner

VIDEO HEAT MAPS PERSONALIZED FOR ONLINE SYSTEM USERS

BACKGROUND

This disclosure relates generally to videos at online systems, and more particularly to generating video heat maps that are personalized to users of an online system.

Online systems have become increasingly prevalent in digital content distribution and consumption, and allow users to more easily communicate with one another. Users of an online system associate with other online system users, forming a web of connections. Additionally, users may share personal information and other stories with other users connected to them via an online system. Examples of information shared by online system users include videos, music, contact information, background information, job information, interests, photos, notes, and/or other member-specific data.

An online system stores videos and other types of media files, such as audio files, pictures, documents, etc., for presenting to users of the online system. The videos can be created by the online system, uploaded by online system users, or received from third parties. Online system users may engage with videos presented to them in various ways. For example, an online system user may play, express preference, comment on, share, hide or leave videos presented to them. An online system user can also decide what videos to share with other users connected to the user at the online system, e.g., through a newsfeed of the user.

It encourages an online system user to use the online system if the online system can present videos that are of interest to the online system user. Current methods of evaluating whether a video is of interest to an online system user usually consider the video as a whole and focus on popularity of the video. However, an online system user may be more interested in engagement with one portion of a video than another portion of the video or the video as a whole. Also, different online system users often have different interests in engaging with a same portion of a same video. A popular video is not necessarily of interest to all online system users.

SUMMARY

An online system presents a video to a target user of the online system and generates a heat map of the video that is personalized to the target user (referred as "personalized heat map"). The video can be divided into segments. The personalized heat map visually indicates segments of the video likely to be of interest to the target user as indicated by a personalized score for the user of each segment of the video. A personalized score for a segment indicates a likelihood of the target user's engagement with the segment. The online system determines the personalized score for a segment based on, for example, a user vector of the target user and action vectors of the segment.

The user vector and action vectors are embedding vectors. An embedding vector describes its subject in latent space. Latent space is a vector space where each dimension or axis of the vector space is a latent or inferred characteristic of the content item in the space. The user vector of the target user describes the target user and can be determined based on embedding vectors of content items with which the target user has previously interacted. An action vector of the segment describes the segment as represented by an action (e.g., playing, sharing, liking, commenting on, hiding, leaving, etc.) performed on the segment by online system users other than the target user. An action of the segment can be determined based on user vectors of online system users who performed the action on the segment over a period of time.

In some embodiments, the online system uses a trained model to determine the personalized score of the segment. For example, the online system inputs into the trained model the user vector of the target and each action vector of the segment, and the trained model outputs the personalized score. Based on personalized scores of all the segments of the video, the online system can generate the personalized heat map for the target user. The personalized heat map may include sections, each of which is associated with a segment of the video and also associated with an indicator that indicates the personalized score of the segment. The personalized heat map can be provided to the target user along with the video.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
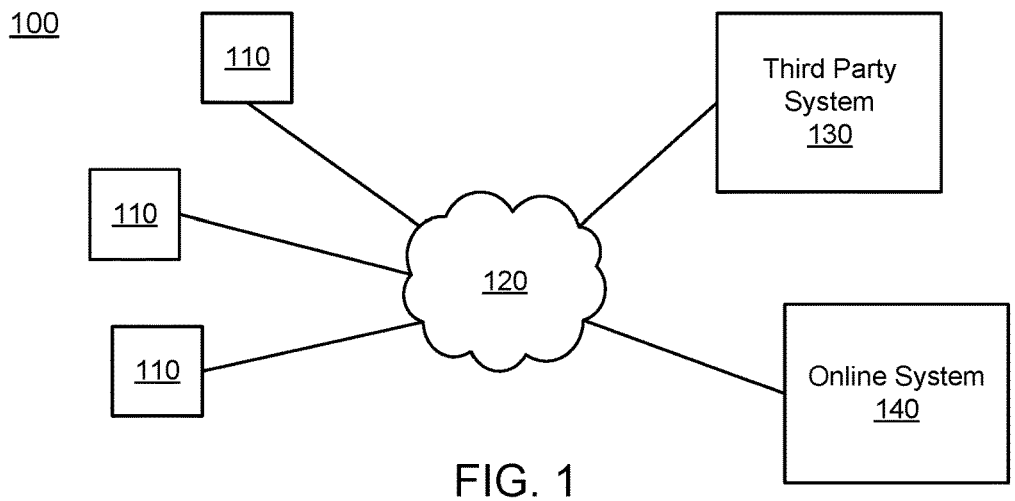
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In some embodiments, a client device 110 executes a software module that plays videos. The software module allows the user to play, pause, or leave a video.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
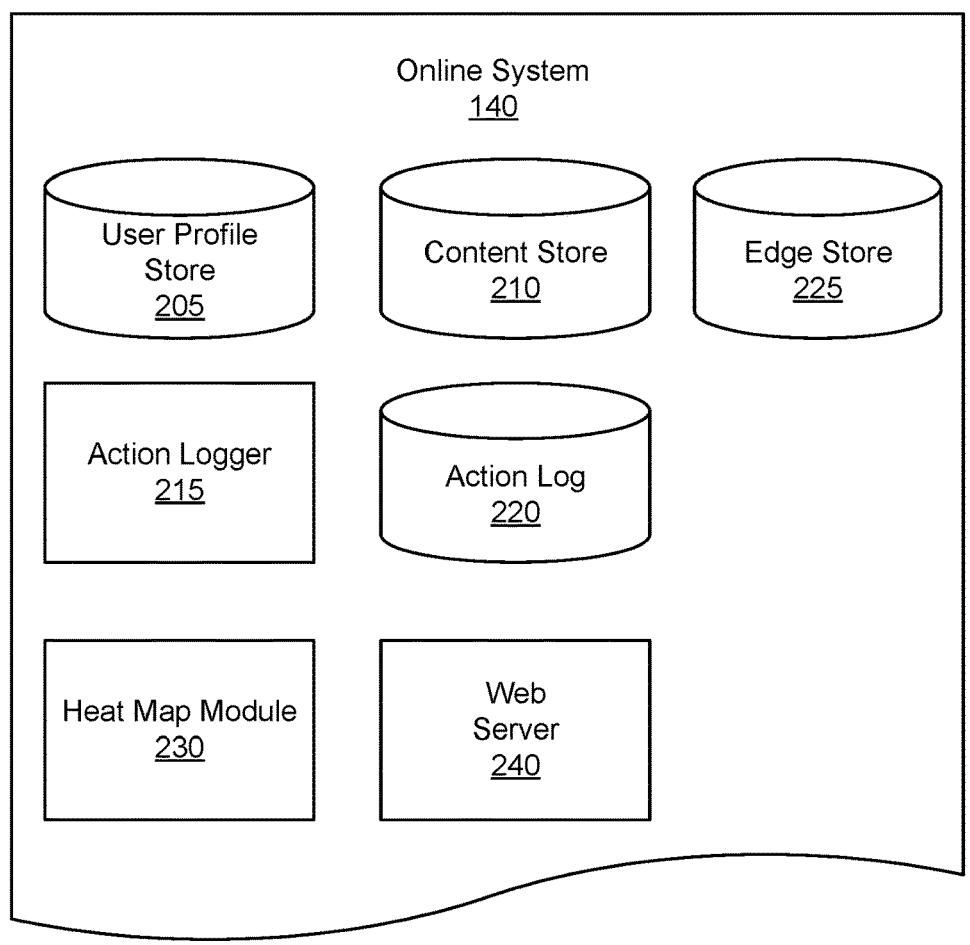
FIG. 2 is a block diagram of an online system having a heat map module, in accordance with an embodiment.

FIG. 2 is a block diagram of an online system 140, in accordance with an embodiment. The online system 140 shown in FIG. 2 includes a user profile store 205, a content store 210, an action logger 215, an action log 220, an edge store 225, a heat map module 230, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like.

Another example of information stored in a user profile is an embedding vector of the user (referred to as "user vector"). The user vector describes the user in a vector space where each dimension or axis of the vector space is a latent or inferred characteristic of the user in the space. Latent characteristics are characteristics that are not observed, but are rather inferred through a mathematical model from other variables that can be observed. In one embodiment, the user vector has 128 dimensions. The user vector can be generated based on embedding vectors of content items that the user has engaged with or otherwise associated with. More information about generating user vectors is described in conjunction with FIG. 3.

A user profile may store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects. Each of the objects represents various types of content. Examples of content represented by an object include a page post, a status update, a photograph, a video, an audio, a link, a shared content item, a gaming application achievement, a check-in event at a local business, a brand page, or any other type of content. Content stored in the content store 310, regardless of its composition, may be referred to herein as one or more "content items," or as "content."

The content store 210 may also store information describing or otherwise related to the content. For example, the content store 210 stores embedding vectors of content items stored therein. An embedding vector of a content item describes the content item in a vector space where each dimension or axis of the vector space is a latent or inferred characteristic of the content item in the space. In one embodiment, the embedding vector has 128 dimensions. The embedding vectors can be generated by applying an embedding model to the content items. The embedding model can be trained using machine learning techniques, e.g., a stochastic gradient descent algorithm, based on content item co-engagement. Co-engagement of content items refers to two or more content items being interacted with by a same user. The level of co-engagement of two or more content items is proportional to the number of online system users that have interacted with all of the two or more co-interacted content items. For another example, the content store 210 can store personalized heat maps created by the heat map module 230 for videos stored therein. More details about personalized heat maps and the heat map module 230 are described below.

Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140. Content items can be presented, e.g., through newsfeed, to an online system user and other online system uses that are connected to the online system user.

The action logger 215 receives communications about user actions internal to and/or external to the online system 140, populating the action log 220 with information about user actions. Examples of actions include adding a connection to another user, sending a message to another user, uploading an image, reading a message from another user, playing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: expressing preference or disfavor of posts, commenting on posts, hiding posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. A user may perform different actions on different types of content items. For example, for videos, actions that a user may perform include playing the video, commenting on the video, liking the video, sharing the video, hiding the video, leaving the video, deleting the video, etc. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage playing histories, advertisements that were interacted, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The heat map module 230 generates personalized heat maps for online system users. For example, the heat map module 230 generates a personalized heat map of a video presented to a target user. The heat map module 230 can divide the video into segments. The heat map indicates how likely each segment of the video is of interest to the target user, i.e., likelihood that the target user would engage with the segment of the video. The heat map module 230 estimates the likelihood based on a user vector of the target user and action vectors of each segment of the video. The user vector of the target user describes the target user; and an action vector of a segment describes the segment as represented by an action that online system users other than the target user (referred to as "other users") performed on the segment.

In some embodiments, the user vector of the target user is determined based on embedding vectors of content items that the target user has previously interacted with. For example, the heat map module 230 determines the user vector of the target user by averaging the embedding vectors of all web pages that the target user has played. The embedding vectors of all web pages can be retrieved from the content store 210 or generated by the heat map module 230.

In some embodiments, an action vector of a segment is determined by averaging user vectors of one or more other users who have performed the action on the segment over a period of time. It is assumed that a user performed the action on the segment if the user performed the action when the segment was being played. For example, the heat map module 230 determines a sharing vector that is the average of a user vector of each online system user who shared the video whiling playing the segment. Likewise, for each segment, the heat map module 230 can determine a playing vector, a commenting vector, a liking vector, a hiding vector, a disliking vector, a leaving vector etc.

The heat map module 230 applies the user vector of the target user and the action vectors of each segment into a model trained using machine learning techniques. The model outputs a personalized score of the segment indicating a likelihood of the target user's engagement with the segment. The heat map module 230 can generate the personalized heat map using the personalized score of the segments. For example, the heat map module 230 associates each segment of the video with an indicator that indicates the personalized score of the segment for the target user. The generated personalized scores and personalized heat map can be stored in the content store 210.

The web server 240 links the online system 140 via the network 120 to the one or more client devices 110, as well as to the one or more third party systems 130. The web server 240 serves web pages, as well as other content, such as JAVA®, FLASH®, XML, and so forth. The web server 240 may provide application programming interface (API) functionality to send data directly to native client device operating systems, such as IOS®, ANDROID™, or BlackberryOS. For example, the webserver 240 can provide personalized heat maps generated by the heat map module 230 to online system users. Additionally, the web server 240 may receive and route messages between the online system 140 and the client device 110, for example, instant messages, queued messages (e.g., email), text messages, short message service (SMS) messages, or messages sent using any other suitable messaging technique.

Personalized Heat Map Generation

Figure 3:
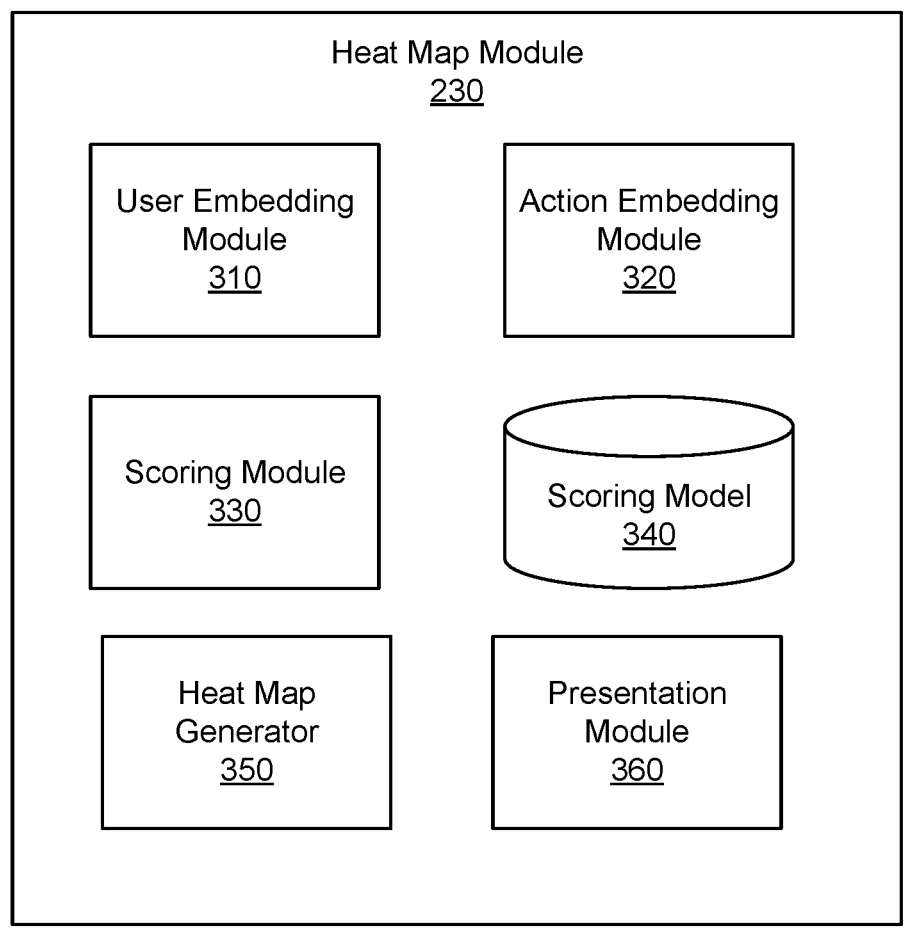
FIG. 3 is a block diagram of the heat map module of the online system, in accordance with an embodiment.

FIG. 3 is a block diagram of the heat map module 230 of the online system 140, in accordance with an embodiment. The heat map module 230 in the embodiment of FIG. 3 includes a user embedding module 310, an action embedding module 320, a scoring module 330, a scoring model 340, a heat map generator 350 and a presentation module 360. In other embodiments, the heat map module 230 may include additional, fewer, or different components for various applications.

The user embedding module 310 determines a user vector for a target user of the online system 140. In some embodiments, the user vector is determined based on embedding vectors of content items (e.g., pages) that the target user has interacted with. The user embedding module 310 retrieves past interactions of the target user with other content items (i.e., content items other than the video) presented by the online system to the target user. The retrieved past interactions provides information about the types of content that are of interest to the user.

In one embodiment, the user vector may be determined using Equation (1):

$$\langle \text{user\_vector} \rangle = \frac{1}{N} \sum_{i=1}^{N} \alpha_i \langle \text{content}_i\text{\_vector} \rangle \quad (1)$$

where $\alpha_i$ is a weight for a type of interaction the target user had with a content item and <$\text{content}_i$_vector> is the embedding vector of the content item. Types of interactions may include playing a content item, commenting on a content item, liking a content item, sharing a content item, disliking a content item, hiding a content item, etc. Different types of interactions may have different weights. For example, sharing a content item may have greater weight than liking a content item. In some embodiments, the weight $a_1$ may also account for a time decay based on how long ago the target user interacted with the entity. For example, interactions that happened a longer time ago can have a smaller weight than interactions that happened more recently. In one embodiment, all types of interactions have the same weight. That is, the user vector of the target user is equal to the average of the embedding vectors of the content items that the target user has interacted with. The user embedding module 310 may retrieve the embedding vectors of the content items that the target user has interacted with from the content store 210. Alternatively, the user embedding module 310 may determine the embedding vectors of the content items.

The action embedding module 320 divides the video into segments and determines one or more action vectors for each segment. In one embodiment, the segments have a fixed size. In another embodiment, the segments have variable sizes. The size(s) of the segments may be pre-determined manually or by the heat map module 230 based on one or more factors. One factor is features of the videos. For example, if the length of the video is short, the size(s) of the segments of the video should be small. In that way, the generated heat map can indicate the target user's interest in a reasonable number of segments of the video, as opposed to the whole video. Another factor is the content of the video. For example, if the video shows a number of stories, each of which is short, the size(s) of the segments should be smaller because the target user can have different levels of interest to each of those stories. Watching habits of the target user may also be taken into account. For example, action of the target user stored in the action log 220 may indicate that the target user often only request access to a small portion of each video presented to the target user. In such a situation it is a better to have small size segments. In other embodiments, there can be other factors to consider for determining the size of the segments.

For each segment, the action embedding module 320 identifies one or more actions performed the segment by other users of the online system 140 over a period of time. The period of time may be pre-fixed, e.g., an hour, a day, a week or a month. Alternatively, the period of time may be determined based on various factors. One factor is the number of actions performed on a segment per time unit. For example, if only few actions were performed on the segment per hour, the period of time should be longer than one hour. The action embedding module 320 determines an embedding vector for each identified action (i.e., action vector). In one embodiment, an action vector of an action is equal to the average of user vectors of the online system users who performed the action on the segment. For example, if there are 100 online system users who shared the segment, the sharing vector for the segment is the average of the user vectors of the 100 online system users. Likewise, the action embedding module 320 can also determine a playing vector, a liking vector, a commenting vector, a disliking vector, a hiding vector and a leaving vector for the segment.

In an alternative embodiment, an action vector of an action may not be the same as the average of user vectors of the online system users who performed the action on the segment. For example, an action vector may be determined using Equation (2).

$$\langle \text{action\_vector} \rangle = \frac{1}{N} \sum_{i=1}^{N} \alpha_i \langle \text{user}_i\text{\_vector} \rangle \quad (2)$$

where $\alpha_i$ is a weight for an online system user who performed the action on the segment and $\langle \text{user}_i\text{\_vector} \rangle$ is the embedding vector of the online system user. The weight of the online system user may depend on how close the online system user is connected to the target user on the online system 140. For instance, if a first online system user interacts with the target user or objects associated with the target user more often than a second online system user, the weight of the first online system user can be higher.

The scoring module 330 applies machine learning techniques to train the scoring model 340 that when applied to a segment of the video outputs a personalized score for the segment. For example, the scoring module 330 applies the user vector of the target user and each action vector of the segment to the scoring model 340 to determine the personalized score. In one embodiment, the scoring module 330 forms a training set by identifying a positive training set based on positive label actions taken by the other users on each of the segments of the video and a negative training data set based on negative label actions taken by the other users on each of the segments of the video. The positive label actions, e.g., playing, liking, commenting on and sharing, indicate a positive sentiment toward the segment. The negative label actions, e.g., leaving, hiding and pausing, indicate a negative sentiment toward the segment.

The training data sets can be saved at a training data store. The training data sets include information about online system users who performed actions on a segment of the video and the actions performed by the online system users. It is assumed that an online system user performed the action on the segment if the online system user performed the action during the playtime of the segment. The information can be received from the user profile store 205 and the action log 220.

The scoring module 330 trains the scoring model 340 using features extracted from the training data sets. In one embodiment, the features include a group of action features. Each action feature corresponds to a dot product of a user vector of an online system user who performed an action on the segment and an action vector for the action. Accordingly, there may be various types of action features, e.g., playing feature, liking feature, commenting feature, sharing feature, hiding feature, leaving feature, etc. Each action feature may have a different weight. One factor to determine a weight of an action feature is the type of the action. For example, the sharing feature may have higher weight than the playing feature as it can be assumed that sharing involves more engagement with the segment than merely playing. Another factor to determining a weight of an action feature is a number of online system users who performed the corresponding action. For example, if there are more online system users who liked the segment than online system users who shared the segment, the weight of the liking feature is higher than the weight of the sharing feature. There can be other factors to determine a weight of an action feature.

In some embodiments, the scoring module 330 uses supervised machine learning to train the score model 340. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments. The scoring model 340 can be saved in the online system 140 and the scoring module 330 can periodically re-train the scoring model 340 using features based on updated training data.

In some embodiments, a validation set is formed of additional segments of videos, other than those in the training set, which have already been determined to be of interest to the target user. The scoring module 330 applies the trained scoring model 340 to the segments of the validation set to quantify the accuracy of the scoring model 340. Common metrics applied in accuracy measurement include: Precision=TP/(TP+FP) and Recall=TP/(TP+FN), where precision is how many the scoring model 340 correctly predicted (TP or true positives) out of the total it predicted (TP+FP or false positives), and recall is how many the scoring model 340 correctly predicted (TP) out of the total number of segments that was of interest to the target user (TP+FN or false negatives). The F score (F-score=2*PR/(P+R)) unifies precision and recall into a single measure. In one embodiment, the scoring module 330 iteratively re-trains the scoring model 340 until the occurrence of a stopping condition, such as the accuracy measurement indication that the model is sufficiently accurate, or a number of training rounds having taken place.

The scoring model 340 takes each dot product of the user vector of the target user and each action vector of the segment for each action that other online system users have performed on the segment and generates a personalized score for the segment. In one embodiment, the score model 340 is a logistic regression model. An example of the scoring model 340 is shown in Equations (3) and (4).

$$y = \sum_{i=1}^{N} w_i \times d_i \qquad (3)$$

$$Y = \frac{1}{1 + e^{-(a+b \cdot y)}} \qquad (4)$$

where N is the number of actions; $w_i$ is weight of an action; $d_i$ is a dot product of the user vector of the target user and the action vector of the segment for the action; Y is the personalized score of the segment; and a and b are parameters output from the training of the scoring model 340.

A generated personalized score can indicate a likelihood that the target user would engage with the segment. For example, the personalized score is a value between 0 and 1, where 1 indicates that the target user will engage with the segment, 0.5 indicates that there is a 50% chance that the target user will engage with the segment and 0 indicates that the target user will not engage with the segment. Alternatively, the personalized score can be either 1 or 0. In other embodiments, the personalized score of the segment can be other values.

The heat map generator 350 generates a personalized heat map for the target user based on the personalized score for each segment. The personalized heat map can be provided to the target user, e.g., together with the video. In one embodiment, the heat map generator 350 can associate an indicator with each segment. The indicator indicates the personalized score of the segment. The generated personalized heat maps includes the indicator for each segment and visually indicates segments of the video likely to be interest to the target user as indicated by each segment's personalized score.

Figure 4:
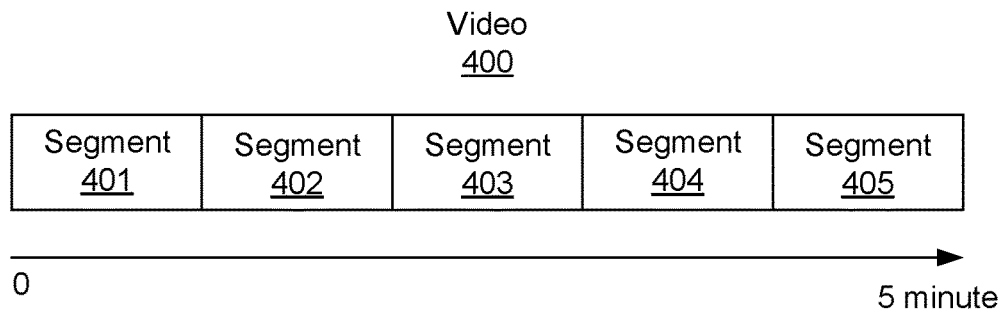
FIG. 4 shows example personalized heat maps generated for a target user of the online system, in accordance with an embodiment.
Figure 4:
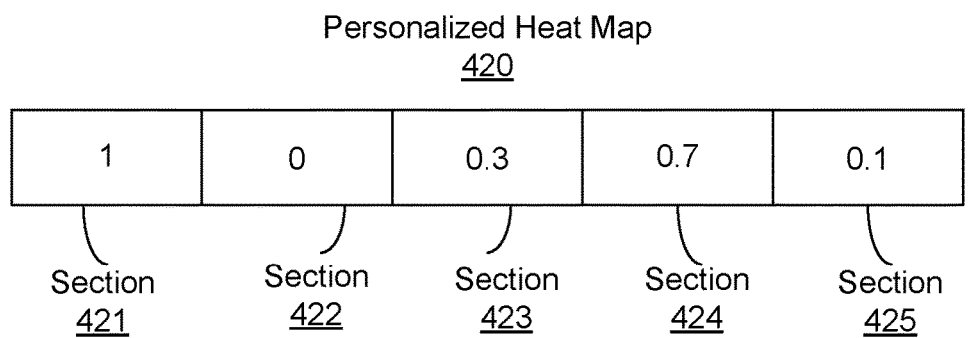
Figure 4:
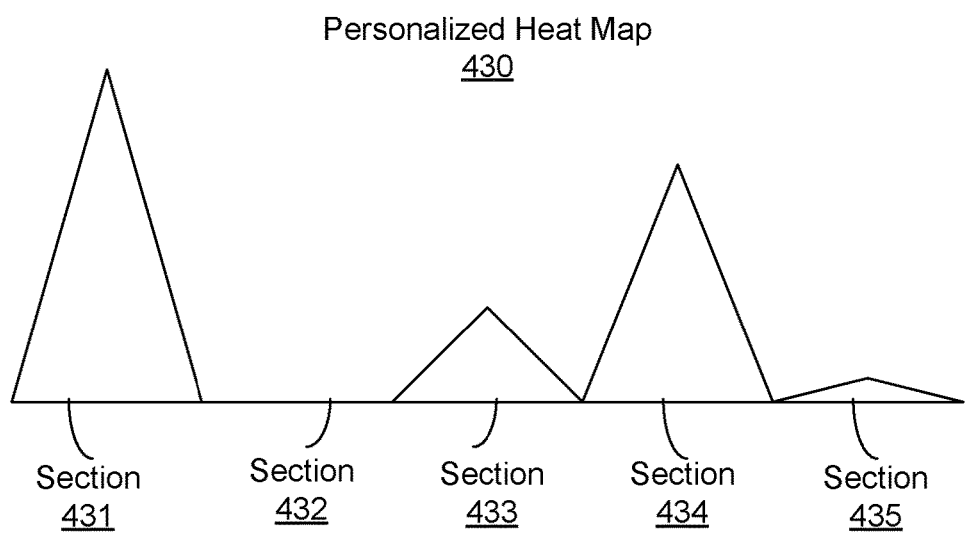

FIG. 4 shows example personalized heat maps generated for a target user of the online system 140, in accordance with an embodiment. FIG. 4 includes a video 400 and two example personalized heat maps 420 and 430 for the video 400. The video 400 in the embodiment of FIG. 4 has a length of 5 mines and includes five segments 401-405. Each of the segments 401-405 has a size of one minute. Personalized scores of the segments 401-405 are probabilities that the target user would engage with the segments. The segment 401 has a personalized score of 1; the segment 402 has a personalized score of 0; the segment 403 has a personalized score of 0.3; the segment 404 has a personalized score of 0.7; and the segment 405 has a personalized score of 0.1. In other embodiments, the video 400 may have a different length and a different number of segments, and the personalized scores of the segments may have different values.

The personalized heat map 420 is a bar including five sections 421-425. Each section corresponds to a segment of the video 400. The location of each section in the bar is determined based on the location of the corresponding segment in the video 400. Each of the sections 421-425 shows the personalized score of the corresponding segment of the video 400. In alternative embodiments, the heat map generator 350 may generate a color bar using color code to indicate the personalized scores of the segments 401-405. For example, red indicates the highest personalized score, 1; and blue indicate the lowest personalized core, 0. Colors between red and blue indicate personalized scores between 1 and 0. In one embodiment, the section 421 is red; the section 422 is blue; the section 423 is green; the section 424 is orange; and the section 425 is light blue. For another example, the personalized heat map 420 can be a grayscale bar, where the section 421 is black corresponding to the personalized score of 1, the section 422 is white corresponding to the personalized score of 0, the section 423 is light gray, the section 424 is dark gray, and the section 425 is a lighter gray than the section 423.

The personalized heat map 430 includes five sections 431-435, corresponding to the segments 401-405, respectively. Each of the sections 431-435 has a triangle, the height of which is proportional the personalized scores of the corresponding segment. Accordingly, the height of the triangle for section 431, which corresponds to the segment 401 having a personalized score of 1, is 10 times of the height of the triangle for section 425, which corresponds to the segment 405 having a personalized score of 0.1. Because the segment 402 has a personalized score of 0, the "triangle" fir the section 432 has no height, which is therefore shown as a line. The heat map generator 350 can user other shapes than triangles as indicators, such as rectangular, three-dimensional shapes, etc. Also, the heat map generator 350 can generate personalized heat maps using other forms that are not shown in FIG. 4.

Turning now back to FIG. 3, the presentation module 360 provides personalized heat maps generated by the heat map generator 350 to the target user. In one embodiment, a personalized heat map can be provided to the target user together with the video. In an alternative embodiment, the presentation module 360 provides an option of whether to play a personalized heat map to the target user. For example, the presentation module 360 may receive the target user's selection of an option to play a personalized heat map and provide the personalized heat map to the target user. The option may include a list of different types of personalized heat maps for the video, e.g., color bar, triangles, three-dimensional, etc. Receiving the target user's selection of a type, the presentation module 360 can provide a personalized heat map of the selected type to the target user.

Figure 5:
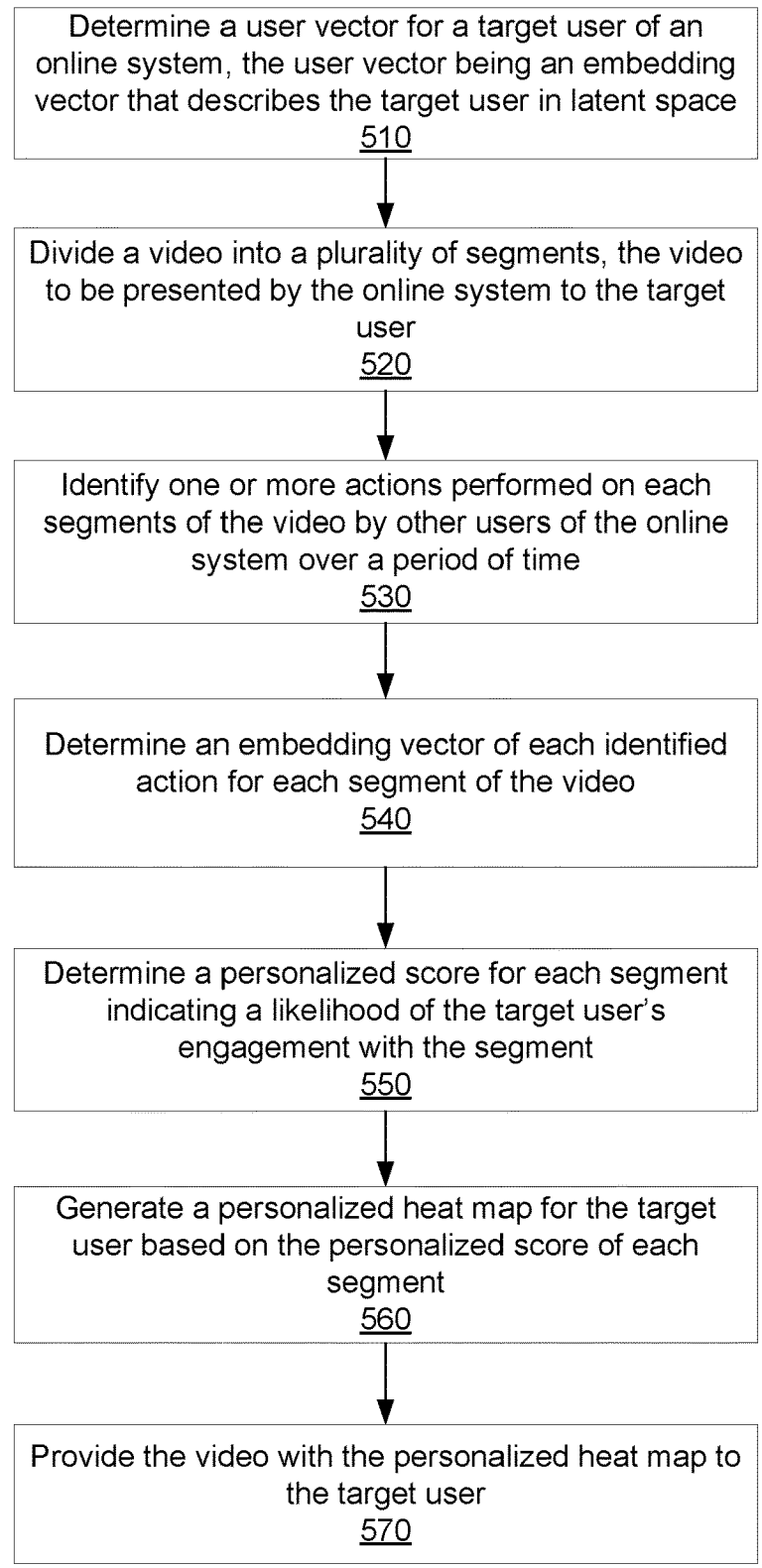
FIG. 5 is a flowchart illustrating a process for generating a personalized heat map for a target user, in accordance with an embodiment.

FIG. 5 is a flowchart illustrating a process for generating a personalized heat map for a target user and presenting the personalized heat map to the target user, in accordance with an embodiment. In some embodiments, the process is performed by the heat map module 230 of the online system 140, although some or all of the operations in the method may be performed by other entities in other embodiments. In some embodiments, the operations in the flow chart are performed in a different order and can include different and/or additional steps.

The heat map module 230 determines 510 a user vector for a target user of an online system 140. The user vector is an embedding vector describing the target user in latent space. The latent space is a vector space where each dimension or axis of the vector space is a latent or inferred characteristic of the content item in the space. The user vector can be determined based on embedding vectors of content items that the target user has interacted with. The heat map module 230 divides 520 a video into a plurality of segments. The video is to be presented to the target user by the online system 140 and has been presented to one or more other users of the online system. The heat map module 230 identifies 530 one or more actions performed on each segment of the video by the other online system users over a period of time. For each identified action, the heat map module 230 determines 540 an embedding vector of the action (i.e., action vector) for the segment. For example, the heat map module 230 uses user vectors of user of the online system who performed the action on the segment to determine the embedding vector of the action. Based on the user vector of the target user and the action vectors of each segment, the heat map module 230 determines 550 a personalized score for each segment indicating a likelihood of the target user's engagement with the segment. The heat map module 230 generates 560 a personalized heat map for the target user based on the personalized score for each segment. The heat map module 230 provides 570 the video with the personalized heat map to the target user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   determining a user vector for a target user of an online system, the user vector being an embedding vector that describes the target user in latent space;
   dividing a video into a plurality of segments, the video to be presented by the online system to the target user;
   identifying one or more actions performed on each of the segments the video by other users of the online system over a period of time;
   determining an embedding vector of each identified action for each segment of the video;
   determining a personalized score for each segment indicating a likelihood of the target user's engagement with the segment based on the embedding vector of each identified action and the user vector of the target user;
   generating a personalized heat map for the target user based on the personalized score of each segment, the personalized heat map indicating visually segments of the video likely to be of interest to the target user as indicated by each segment's personalized score; and
   providing, for display to a client device of the target user, the video with the personalized heat map indicating segments of interest to the target user.

2. The method of claim 1, wherein determining the personalized score for each segment comprises:
   determining a dot product of the embedding vector of each identified action and the user vector of the target user; and
   applying the dot product to a model trained to determine the personalized score, the model trained based on positive label actions or negative label actions taken by the other users on each of the segments of the video, the positive label actions indicating a positive sentiment toward the segment and the negative label actions indicating a negative sentiment toward the segment.

3. The method of claim 2, wherein the trained model is a logistic regression model.

4. The method of claim 1, wherein determining the user vector for the target user comprises:
   retrieving past interactions of the target user with other content presented by the online system to the target user, the past interactions providing information about the types of content that are of interest to the user; and
   determining the user vector based on a weighted sum of the embedding vectors of the other content.

5. The method of claim 1, wherein dividing a video into a plurality of segments comprises dividing the video into segments that each have a fixed size.

6. The method of claim 1, wherein the identified actions on each segment of the video include at least one of the following: playing the segment of the video, liking or reacting to the video while playing the segment, sharing the video while playing the segment, commenting on the video while playing the segment, disliking the video while playing the segment, hiding the video while playing the segment, and leaving the video while playing the segment; and wherein playing, liking, sharing, or commenting are given a positive label, while disliking, hiding, and leaving are given a negative label in terms of the user's interest in that segment, the positive and negative labels used in training a machine learning model with regard to the segments.

7. The method of claim 1, wherein the personalized heat map comprises a plurality of sections, each section associated with a segment of the video and associated with an indicator that indicates the personalized score of the segment for the target user.

8. A non-transitory computer readable medium storing executable computer program instructions, the computer program instructions comprising instructions that when executed cause a computer processor to:
- determine a user vector for a target user of an online system, the user vector being an embedding vector that describes the target user in latent space;
- divide a video into a plurality of segments, the video to be presented by the online system to the target user;
- identify one or more actions performed on each of the segments the video by other users of the online system over a period of time;
- determine an embedding vector of each identified action for each segment of the video;
- determine a personalized score for each segment indicating a likelihood of the target user's engagement with the segment based on the embedding vector of each identified action and the user vector of the target user;
- generate a personalized heat map for the target user based on the personalized score of each segment, the personalized heat map indicating visually segments of the video likely to be of interest to the target user as indicated by each segment's personalized score; and
- provide, for display to a client device of the target user, the video with the personalized heat map indicating segments of interest to the target user.

9. The computer readable medium of claim 8, wherein the computer program instructions for determining the personalized score for each segment comprise instructions that when executed cause the computer processor to:
- determine a dot product of the embedding vector of each identified action and the user vector of the target user; and
- apply the dot product to a model trained to determine the personalized score, the model trained based on positive label actions or negative label actions taken by the other users on each of the segments of the video, the positive label actions indicating a positive sentiment toward the segment and the negative label actions indicating a negative sentiment toward the segment.

10. The computer readable medium of claim 9, wherein the trained model is a logistic regression model.

11. The computer readable medium of claim 8, wherein the computer program instructions for determining the user vector for the target user comprise instructions that when executed cause the computer processor to:
- retrieve past interactions of the target user with other content presented by the online system to the target user, the past interactions providing information about the types of content that are of interest to the user; and
- determine the user vector based on a weighted sum of the embedding vectors of the other content.

12. The computer readable medium of claim 8, wherein the computer program instructions for dividing a video into a plurality of segments comprise instructions that when executed cause the computer processor to divide the video into segments that each have a fixed size.

13. The computer readable medium of claim 8, wherein the identified actions on each segment of the video include at least one of the following: playing the segment of the video, liking or reacting to the video while playing the segment, sharing the video while playing the segment, commenting on the video while playing the segment, disliking the video while playing the segment, hiding the video while playing the segment, and leaving the video while playing the segment; and wherein playing, liking, sharing, or commenting are given a positive label, while disliking, hiding, and leaving are given a negative label in terms of the user's interest in that segment, the positive and negative labels used in training a machine learning model with regard to the segments.

14. The computer readable medium of claim 8, wherein the personalized heat map comprises a plurality of sections, each section associated with a segment of the video and associated with an indicator that indicates the personalized score of the segment for the target user.

15. A computer system comprising:
- a non-transitory computer-readable storage medium storing executable computer program instructions, the computer program instructions comprising instructions that when executed cause a computer processor to perform steps, comprising:
    - determining a user vector for a target user of an online system, the user vector being an embedding vector that describes the target user in latent space;
    - dividing a video into a plurality of segments, the video to be presented by the online system to the target user;
    - identifying one or more actions performed on each of the segments the video by other users of the online system over a period of time;
    - determining an embedding vector of each identified action for each segment of the video;
    - determining a personalized score for each segment indicating a likelihood of the target user's engagement with the segment based on the embedding vector of each identified action and the user vector of the target user;
    - generating a personalized heat map for the target user based on the personalized score of each segment, the personalized heat map indicating visually segments of the video likely to be of interest to the target user as indicated by each segment's personalized score; and
    - providing, for display to a client device of the target user, the video with the personalized heat map indicating segments of interest to the target user.

16. The system of claim 15, wherein determining the personalized score for each segment comprises:
- determining a dot product of the embedding vector of each identified action and the user vector of the target user; and
- applying the dot product to a model trained to determine the personalized score, the model trained based on positive label actions or negative label actions taken by the other users on each of the segments of the video, the positive label actions indicating a positive sentiment toward the segment and the negative label actions indicating a negative sentiment toward the segment.

17. The system of claim 16, wherein the trained model is a logistic regression model.

18. The system of claim 15, wherein determining the user vector for the target user comprises:
- retrieving past interactions of the target user with other content presented by the online system to the target user, the past interactions providing information about the types of content that are of interest to the user; and
- determining the user vector based on a weighted sum of the embedding vectors of the other content.

19. The system of claim 15, wherein the identified actions on each segment of the video include at least one of the following: playing the segment of the video, liking or reacting to the video while playing the segment, sharing the video while playing the segment, commenting on the video while playing the segment, disliking the video while playing the segment, hiding the video while playing the segment, and leaving the video while playing the segment; and wherein playing, liking, sharing, or commenting are given a positive label, while disliking, hiding, and leaving are given a negative label in terms of the user's interest in that segment, the positive and negative labels used in training a machine learning model with regard to the segments.

20. The system of claim 15, wherein the personalized heat map comprises a plurality of sections, each section associated with a segment of the video and associated with an indicator that indicates the personalized score of the segment for the target user.

\* \* \* \* \*